(12) United States Patent
Kanamaru et al.

(10) Patent No.: US 6,654,852 B2
(45) Date of Patent: Nov. 25, 2003

(54) METHOD AND SYSTEM OF READING AND WRITING DATA BY A DISK DRIVE APPARATUS

(75) Inventors: Atsushi Kanamaru, Sagamihara (JP); Takashi Kuroda, Yamato (JP); Hiromi Nishimiya, Yamato (JP); Takahiro Saito, Yokohama (JP); Hiroshi Uchiike, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 09/772,263

(22) Filed: Jan. 29, 2001

(65) Prior Publication Data

US 2001/0020260 A1 Sep. 6, 2001

(30) Foreign Application Priority Data

Jan. 27, 2000 (JP) ........................................ 2000-019379

(51) Int. Cl.[7] .............................................. G06F 12/00
(52) U.S. Cl. ............................... 711/113; 710/5; 710/6; 710/7; 711/100; 711/112; 711/113
(58) Field of Search ............. 710/6, 5, 7; 711/112–113, 711/100

(56) References Cited

U.S. PATENT DOCUMENTS

| 5,761,692 A | * | 6/1998 | Ozden et al. ................... 711/4 |
| 6,029,226 A | * | 2/2000 | Ellis et al. ................... 711/100 |
| 6,571,298 B1 | * | 5/2003 | Megiddo ........................ 710/5 |

* cited by examiner

*Primary Examiner*—Donald Sparks
*Assistant Examiner*—Mehdi Namazi
(74) *Attorney, Agent, or Firm*—Abdy Raissinia; Bracewell & Patterson, L.L.P.

(57) ABSTRACT

The present invention includes a method of reading and writing data on a recording medium, and a system including a disk drive apparatus and a disk drive apparatus controller. According to the method of the present invention, data can be read in the middle of a plurality of write commands provided that the addresses of the read/write data locations do not overlap. This method and system results in improved read/write times.

12 Claims, 16 Drawing Sheets

*SKIP LENGTH = 0

*SKIP LENGTH = SLEN
= (LLBA-LENGTH + 1)-ELBA

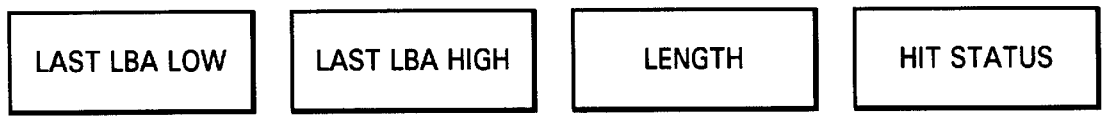
*Fig. 16*
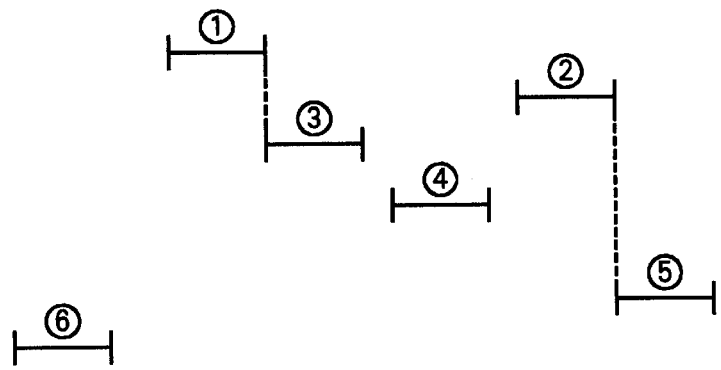
*Fig. 17*
*Fig. 18a*
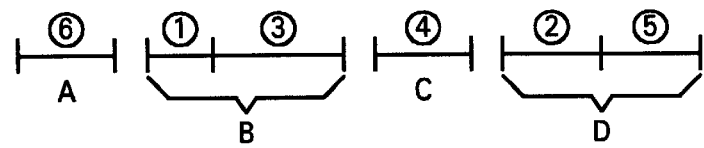
*Fig. 18b*

METHOD AND SYSTEM OF READING AND WRITING DATA BY A DISK DRIVE APPARATUS

This application claims priority under 35 U.S.C. §119 from Japanese Patent Application Serial No. 2000-019379 filed Jan. 27, 2000.

BACKGROUND OF THE INVENTION

1. Technical Field

The present invention relates in general to data reading and writing by a disk drive apparatus, and more particularly, to a method for improved read/write times for a disk drive apparatus.

2. Description of the Related Art

When a host computer issues a plurality of write requests to a hard disk drive apparatus, it takes a considerable amount of time to execute and complete an actual data write. The hard disk drive apparatus notifies a host computer that it has received a command about a write request and at the same time, retains a write command waiting to be executed.

In the case where there are a plurality of write commands waiting to be executed, commands are sequentially selected according to RPO (Rotational Position Optimization), a technique for estimating seek time when a command is executed. Seek time is defined as the length of time after a seek for a target track on a magnetic disk has begun until it is found. Disk rotation waiting time is defined as the time after the track is reached until access to a target sector is started. The last step of RPO is to select a command with the smallest seek and rotation waiting time and to designate that as the next command to be executed.

SUMMARY OF THE INVENTION

The present invention includes a method of writing data that is requested for writing by a host device on a recording medium. The data writing method is characterized by:

a) determining the positional relation of the logical block addresses of a leading write command and the following write command;

b) finding whether the distance between the logical block addresses of the leading write command and the following write command is less than or equal to a predetermined distance in the case where the logical block addresses of the leading write command and the following write command are separate; and c) writing data corresponding to the leading write command and data corresponding to the following write command sequentially on the recording medium.

This occurs in the case when distance between the logical block address of the leading write command and the logical block address of the following write command is equal to or less than a predetermined distance. In the case where there are a plurality of the leading write commands when the distance is determined to be equal to or less than a predetermined distance, it is desirable that the data corresponding to the following write command with the least distance be written immediately after writing the write data corresponding to the leading write command.

In the data reading method, a host device issues a data read request while a data write request is waiting to be executed. An important step of the data reading method includes determining whether there is any overlap between a logical block addresses of a write and read commands. This is accomplished by comparing the logical block addresses of a write command awaiting execution and the logical block address of the read command that is newly issued. Executing the read command before all the write commands are finished occurs in the case where there is no overlap between the logical block addresses of the write and read commands. The read command can be executed following the execution of a write command. This corresponds to the least distance between the head of the logical block address of the read command and the tail of the logical block address of the write command.

The present invention includes a disk drive apparatus with:

a) a randomly accessible disk-shaped recording medium;

b) a command cache for retaining a write command sent from an external device until the command is executed;

c) a system for determining whether there is any overlap between the logical block addresses of the write command retained in the command cache and the command recently sent from the external device;

d) a system for determining whether the distance between the logical block addresses of the write command retained in the command cache and the newly sent write command is greater than a predetermined distance and has no overlap;

e) a system for instructing that write data corresponding to the two commands be written on the recording medium sequentially, when the distance between the write command retained in the command cache and the newly sent write command is not greater than a predetermined distance;

f) a system for determining whether there exists a read command that overlaps the write command at the logical block addresses.

A write command retained in the command cache can be specified to correspond to the least distance for the newly sent write command in the case where there are a plurality of write commands retained in the command cache where the distance is equal to or less than a predetermined distance. A read command can be performed after executing the overlapping read command from among the write commands retained in the command cache in the case where there exists a read command that overlaps the write command at the logical block addresses. A read command can be executed while the write command waiting to be executed is retained in the command cache in the case where the write command and the read command do not overlap at the logical block addresses.

The present invention also includes a disk drive apparatus controller that controls data writing to a randomly accessible disk-shaped recording medium characterized by:

a) a command cache for retaining a leading write command sent in advance from an external device until the command is executed;

b) a system for determining whether there exists a leading write command where the distance from the following write command newly sent from the external device is less than or equal to a predetermined distance at logical block addresses; and c) a system for instructing that a following write command be executed ahead of the leading write command in the case where the distance between the logical block addresses is equal to or less than a predetermined distance.

d) a command cache for retaining a plurality of leading write commands sent from an external device until the commands are executed;

e) a system for determining whether there exists a leading write command that overlaps a read command newly sent from the external device; and f) a system for instructing a read command to be executed ahead of the write command in the case where there exists no leading write command that overlaps the read command at the logical block addresses.

BRIEF DESCRIPTION OF THE DRAWINGS

FIG. 16 illustrates a table stored in RAM 43 in accordance with the presentation;

FIG. 17 depicting a configuration of a write segment in accordance with the presentation;

FIGS. 18a, and 18b illustrate a data write according to this embodiment in accordance with the presentation;

DETAILED DESCRIPTION OF A PREFERRED EMBODIMENT

Figure 1:
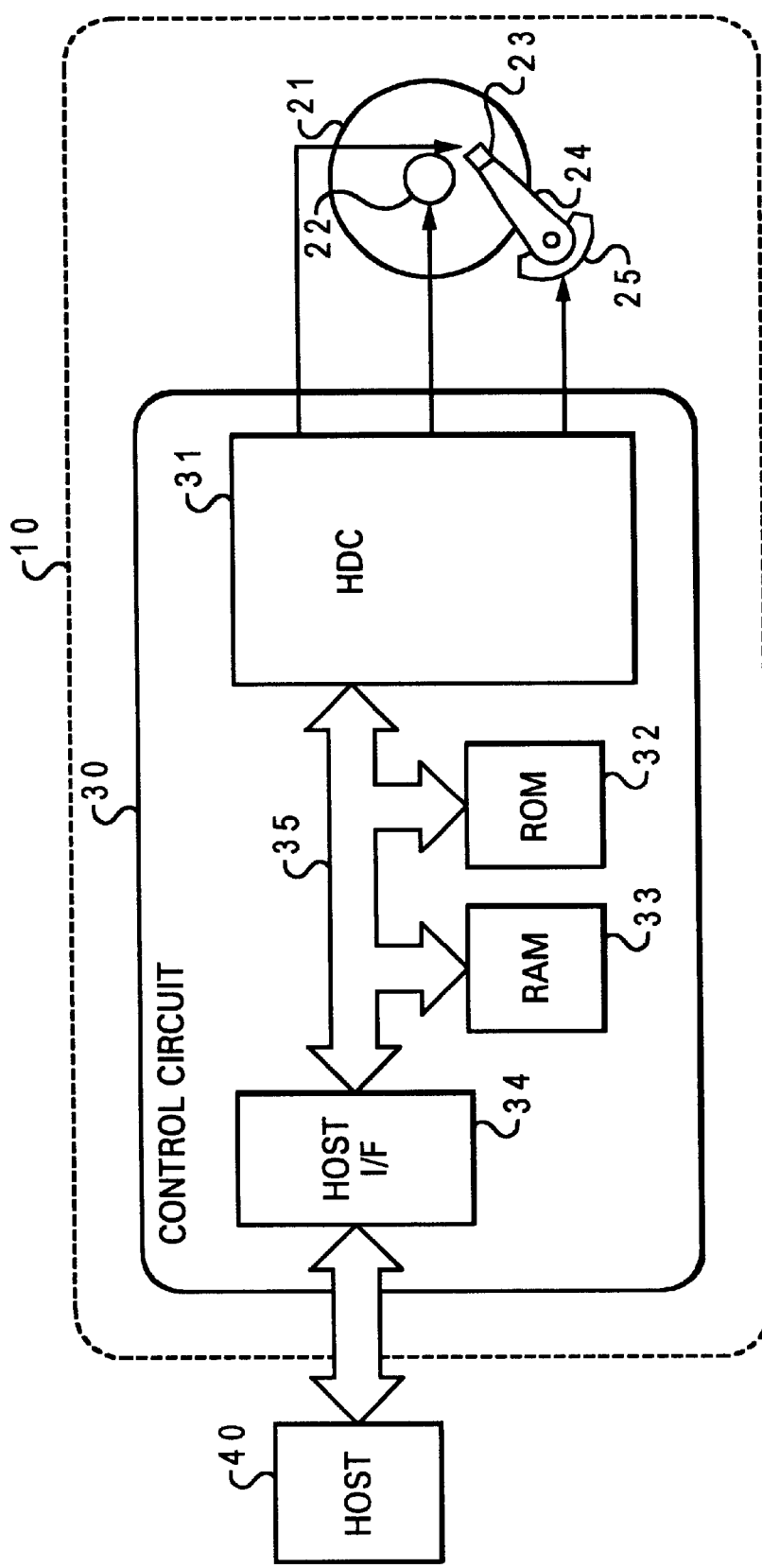
FIG. 1 illustrates a schematic configuration of an HDD (Hard Disk Drive) apparatus according to a preferred embodiment.

With reference to FIG. 1, an outlined configuration of HDD (Hard Disk Drive) apparatus 10 as an external storage apparatus of a computer that implements the present invention is depicted.

As illustrated in the figure, HDD apparatus 10 includes magnetic disk 21 that stores data as a recording medium and spindle motor 22 that rotates and/or drives magnetic disk 21. Magnetic head 23 records and/or reproduces (writes/reads) data to magnetic disk 21. Head arm 24 is attached to the end of magnetic head 23 and moves over the recording surface of magnetic disk 21. Moreover, an actuator 25 holds head arm 24 and rotates and/or drives head arm 24. Magnetic head 23 is configured to move in the quasi-radial direction of magnetic disk 21 and randomly accesses the recording surface of magnetic disk 21.

A driving mechanism configured by magnetic disk 21, spindle motor 22, magnetic head 23 and actuator 25 is controlled by control circuit 30. This control circuit 30 is comprised of HDC (Hard Disk Controller) 31, ROM 32, RAM 33 and host I/F (interface) 34. Bus 35 serves as an interconnect for the above-mentioned parts.

HDC 31 controls HDD apparatus 10 as an internal controller according to a control program and data stored in ROM 32. HDC 31 performs operation processing for both servo and data write/read controls. HDC 31 drives spindle motor 22 and actuator 25. Also, it controls writing/reading using the recording head and reproduction head of magnetic head 23. Furthermore, HDC 31 controls the retention of part of the data recorded in magnetic disk 21 in RAM 33. Sometimes, the advance reading of part of the data stored in magnetic disk 21 is needed and it is stored in RAM 33. HDC 31 also serves as the controller for RAM 33.

ROM 32 stores both the control program and data used by HDC 31. RAM 33 temporarily stores write data to be recorded in magnetic disk 21. It also functions as a cache memory to temporarily store the data read from magnetic disk 21. On the other hand, host I/F 34 is an interface circuit that sends and receives data and commands to and from host 40.

Figure 2:
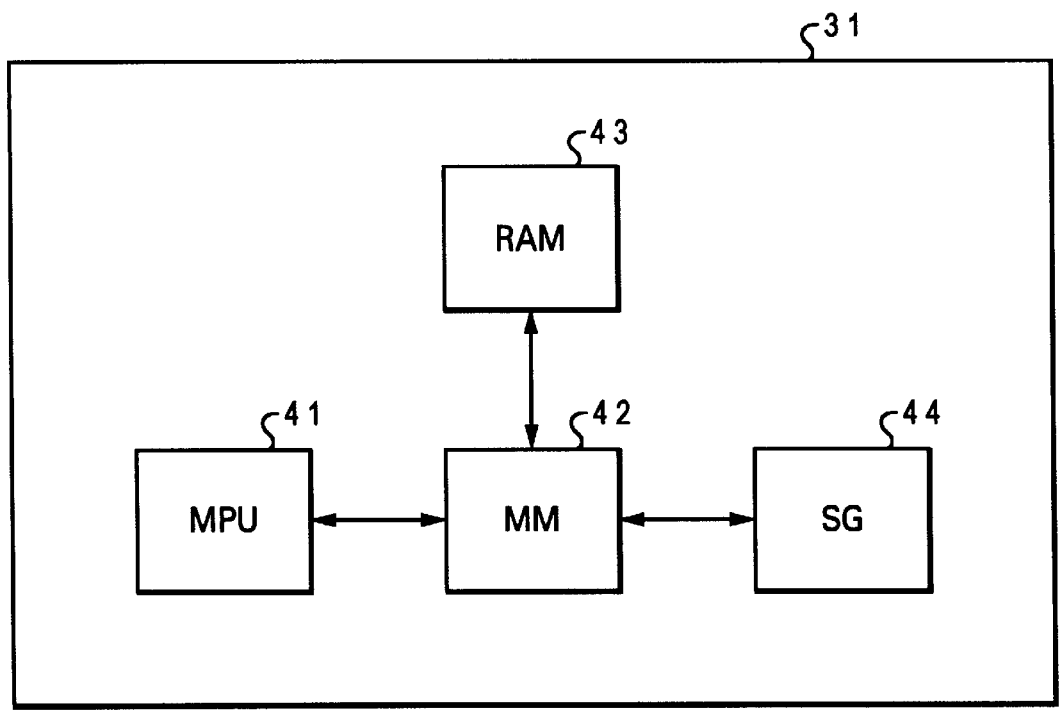
FIG. 2 depicts a main configuration of an HDC (Hard Disk Controller) of the HDD according to a preferred embodiment.

FIG. 2 illustrates a main functional block of HDC 31.

HDC 31 includes MPU (micro processing unit) 41, MM (memory manager) 42, RAM 43, and SG (segment handler) 44. RAM 43 stores a table in the configuration illustrated in FIG. 16 and write segments in the configuration depicted in FIG. 17. The table illustrated in FIG. 16 stores NO OF HIT (number of OVERLAY HITs), HEAD BEST SKIP LENGTH, HEAD BEST SKIP SEGMENT ID, TAIL BEST SKIP LENGTH, and TAIL BEST SKIP SEGMENT ID, all of which will be described later. Moreover, the write segment depicted in FIG. 17 is configured by 4 words, of which LBA uses the first and second words, the block length (LENGTH) uses the third word and HIT STATUS uses the fourth word.

SG 44 accesses RAM 43 via MM 42 and searches the table in RAM 43. Furthermore, SG 44 includes a register that temporarily stores SKIP LENGTH, which will be described later.

This embodiment of the present invention determines the positional relation between a logical block address (hereinafter referred to as "LBA") of a leading write command already sent from host 40 and a logical block address of a following write command newly sent from host 40. Information on the LBA, that is, the head and tail LBAs for the write command and block length are sent from host 40 together with the write command and write data.

This write data is temporarily stored in RAM 33 and the information on the LBA is stored in the write segment in the manner illustrated in FIG. 17.

Suppose a leading write command is referred to as "buffer data" and a following write command is simply referred to as "write command." Furthermore, the positional relation on LBA may be simply referred to as "relation" or "positional relation."

Figure 3:
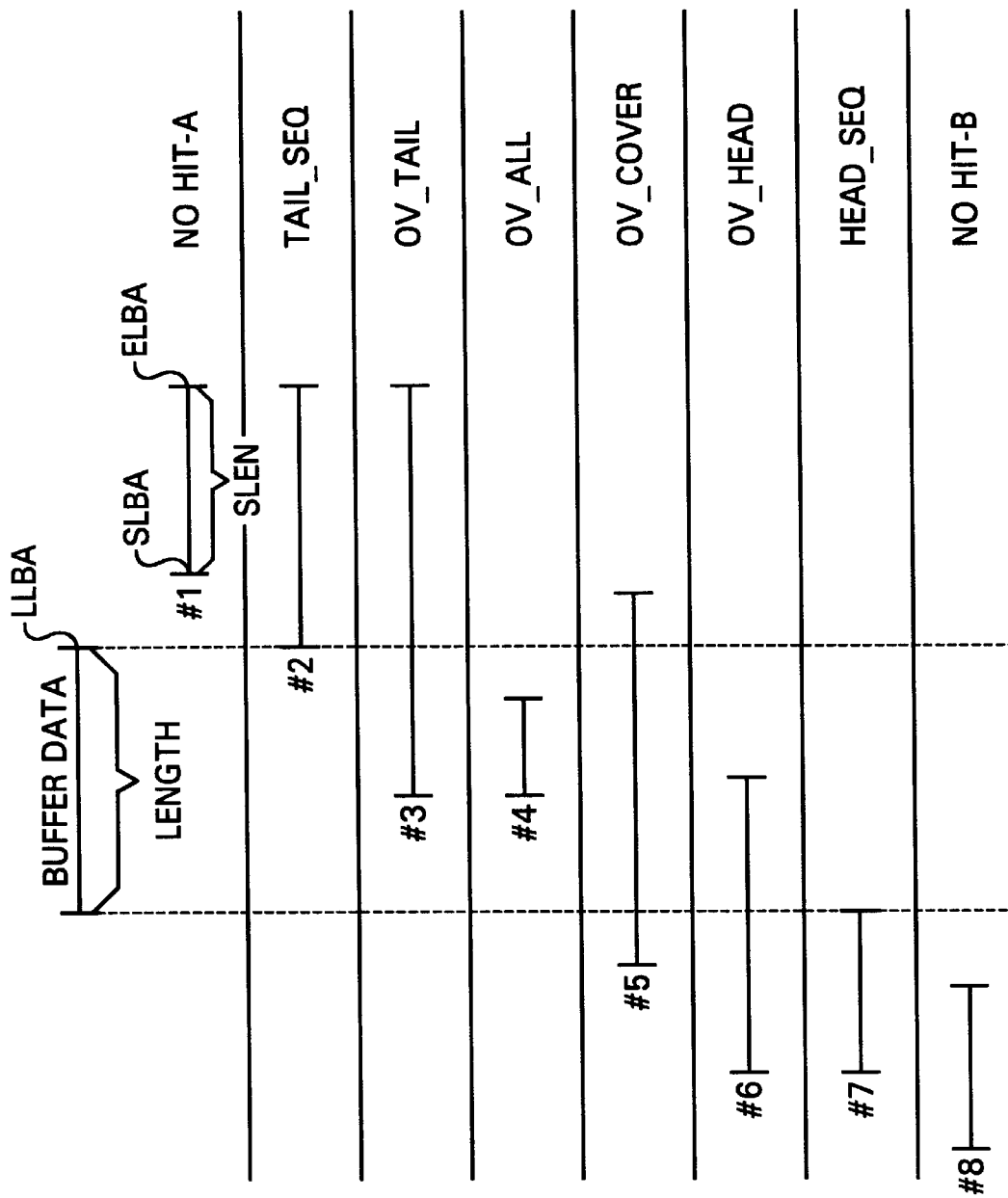
FIG. 3 illustrates the relation between buffer data and write commands in accordance with the presentation.

First, it is determined, based on the LBA, which of 8 types of NO HIT-A, TAIL_SEQ, OV_TAIL, OV_ALL, OV_COVER, OV_HEAD, HEAD_SEQ and NO HIT-B shown in FIG. 3, categorizes the relation between the buffer data and write command. This determination is performed based on the flow illustrated in FIGS. 4 through 6.

Then, the relation between the buffer data and write command is determined in detail based on the flow depicted in FIGS. 7 through 14 also using the LBA. Finally, it is the HDD apparatus that executes RPO based on this determination result.

First, the 8 types determined in the first stage will be explained based on FIG. 3.

FIG. 3 illustrates the LBA at the tail to which buffer data is written is described as "LLBA." On the other hand, the block length of the buffer data is described as "LENGTH." Furthermore, the LBA at the head to which a write command is written is described as "SLBA" and the LBA at the tail is described as "ELBA." The block length of the LBA of the write command is described as "SLEN."

1 to #8 illustrated in FIG. 3 indicate write commands. First, it should be noted that #1 to #8 are described here to classify write commands for convenience, and #1 to #8 do not to indicate the order in which the commands are sent from host 40.

The positional relation of write commands relative to the buffer data is classified into 8 types as depicted in FIG. 3. The content of each type is as shown below:

NO HIT-A

Write command #1 exists in a location distant from the LLBA of the buffer data. As shown above, in the case where write command #1 has no overlap with the buffer data, this is determined as NO HIT-A.

TAIL_SEQ

In the case where the tail of the buffer data is sequentially connected by the head of write command #2, this is determined as TAIL_SEQ.

OV_TAIL

When the buffer data overlaps with write command #3 on the tail side of the buffer data, this is determined as OV_TAIL.

OV_ALL

When write command #4 is completely enclosed within the boundaries of the buffer data, this is determined as OV_ALL.

OV_COVER

When the buffer data is completely enclosed within the boundaries of write command #5, this is determined as OV_COVER.

OV_HEAD

When the buffer data overlaps with write command #6 on the head side of the buffer data, this is determined as OV_HEAD.

HEAD_SEQ

When the head of the buffer data is sequentially connected to the tail of command #7, this is determined as HEAD_SEQ.

NO HIT_B

When write command #8 is distant from the buffer data on the head side of the buffer data, this is determined as NO HIT_B.

The aforementioned determination is made by SG (segment handler) 44 of HDC 31 by comparing the LBA information of the write command with the LBA information of the segment table stored in RAM 33. The specific flow will be explained referring to FIGS. 4 through 6.

Figure 4:
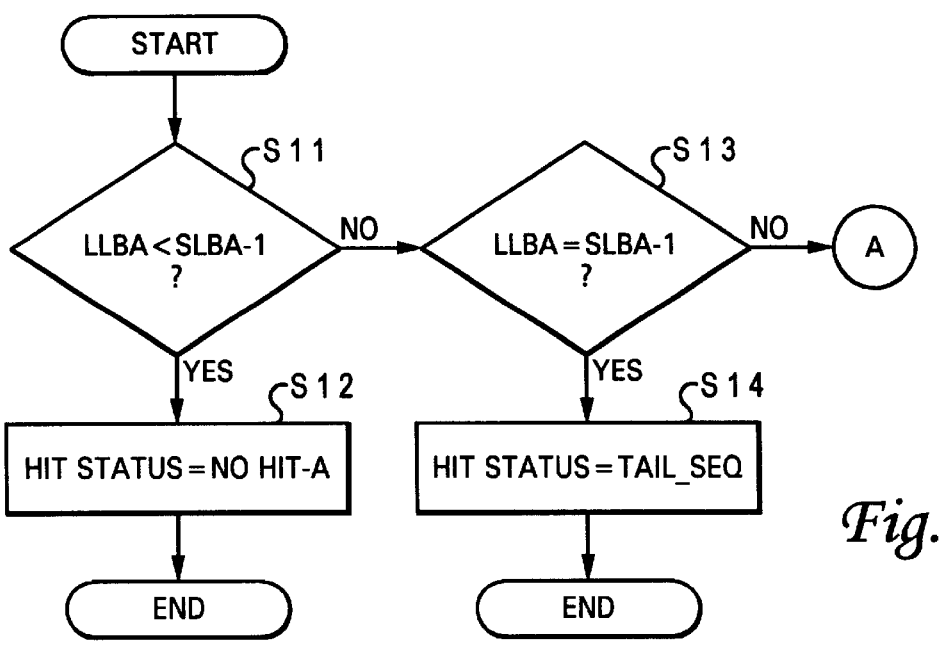
FIG. 4 is a flow chart depicting a method of determining the relation between buffer data and write commands in accordance with the presentation.
Figure 5:
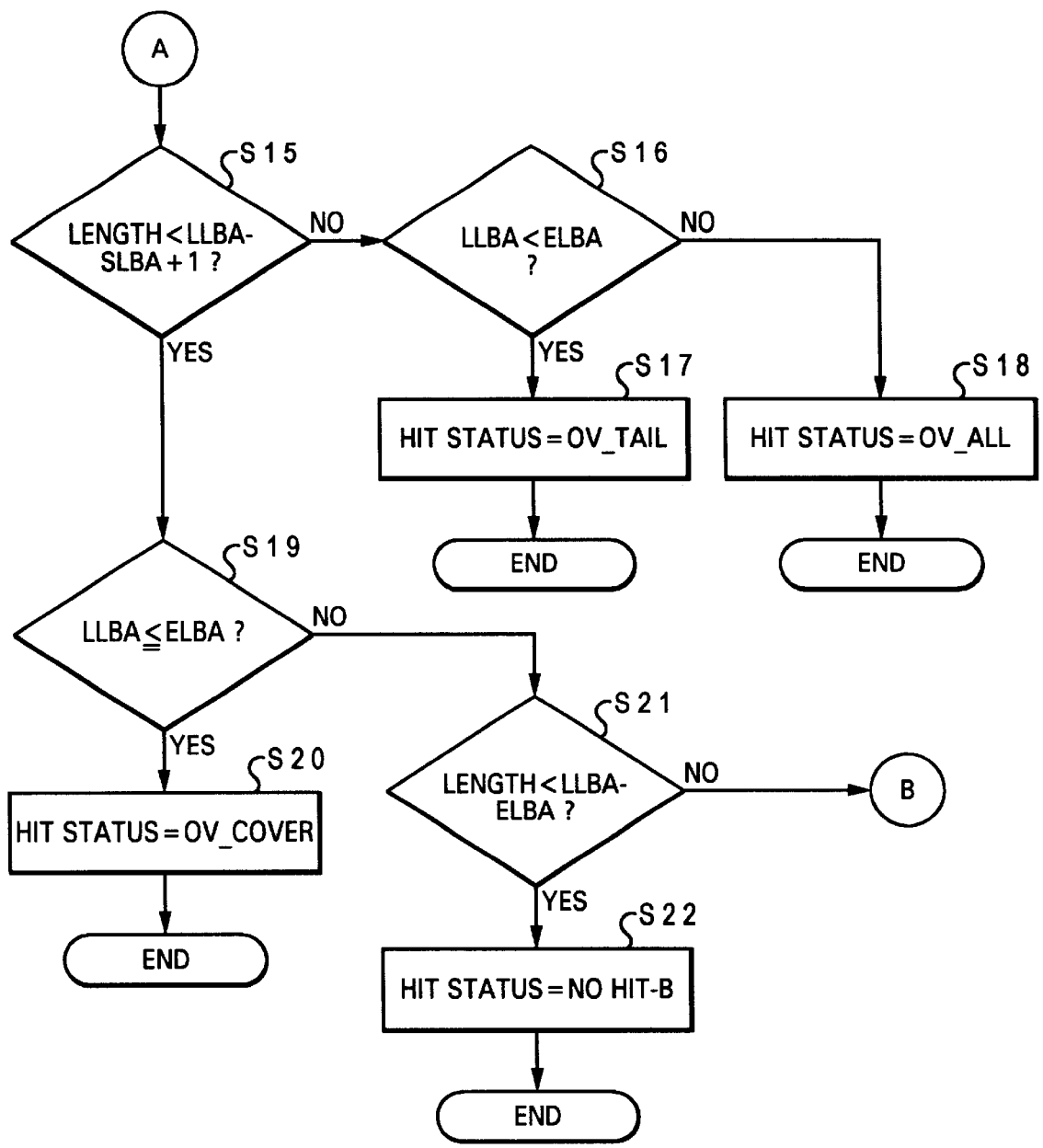
FIG. 5 is a flow chart illustrating a method of determining the relation between buffer data and write commands in accordance with the presentation.
Figure 6:
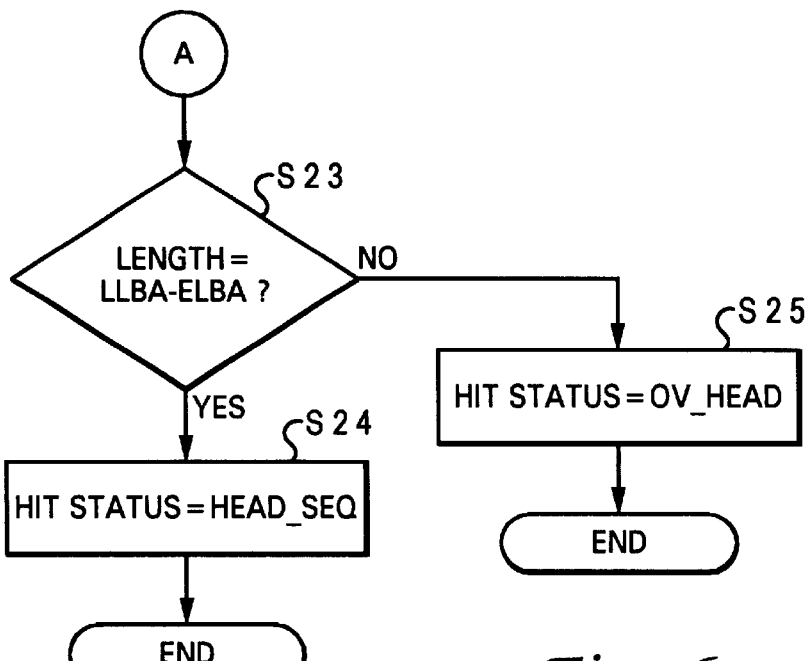
FIG. 6 is a flow chart depicting a method of determining the relation between buffer data and write commands in accordance with the presentation.

In FIGS. 4 through 6, it is determined in step S11 whether LLBA<SLBA−1. The process moves on to step S12 when LLBA<SLBA−1. Otherwise, the processes continues on to step S13. The determination in step S11 is based on a positional comparison between the LBA at the tail of the buffer data and LBA at the head of the write command. In the case where LLBA<SLBA−1, since there is no overlap on LBA between the buffer data and write command in step S12, the relation of the write command with the buffer data (HIT STATUS) is determined to be HIT-A. "A" indicates that the write command exists behind the buffer data.

In step S13, it is determined whether LLBA=SLBA−1, or whether the LBA at the tail of the buffer data is sequentially connected to the LBA at the head of the write command. In the case where the LBA at the tail of the buffer data is sequentially connected to the LBA at the head of the write command, the hit status is determined as TAIL_SEQ in step S14. In the case where LLBA≠SLBA−1, the process moves on to step S15 (hereinafter, referring to FIG. 5).

In step S15, it is determined whether LENGTH<LLBA−SLBA+1. If so, the process moves on to step S19. Otherwise, the process moves on to step S16.

In step S16, it is determined whether LLBA<ELBA. If so, the hit status is determined as OV_TAIL in step S17. Otherwise, the hit status is determined as OV_ALL in step S18.

In step S19, it is determined whether LLBA≦ELBA. If so, the hit status is determined as OV_COVER in step S20. Otherwise, the process moves on to step S21.

In step S21, it is determined whether LENGTH<LLBA−ELBA. If so, the hit status is determined as NO HIT-B in step S22. Otherwise, the process moves on to step S23 (hereinafter, with reference to FIG. 6).

In step S23, it is determined whether LENGTH=LLBA−ELBA. If so, the hit status is determined as HEAD_SEQ. Otherwise, the hit status is determined as OV_HEAD.

This completes the determination in the first stage.

Then, the second-stage processing will be explained with reference to FIGS. 7 through 14.

NO HIT-A

Figure 7:
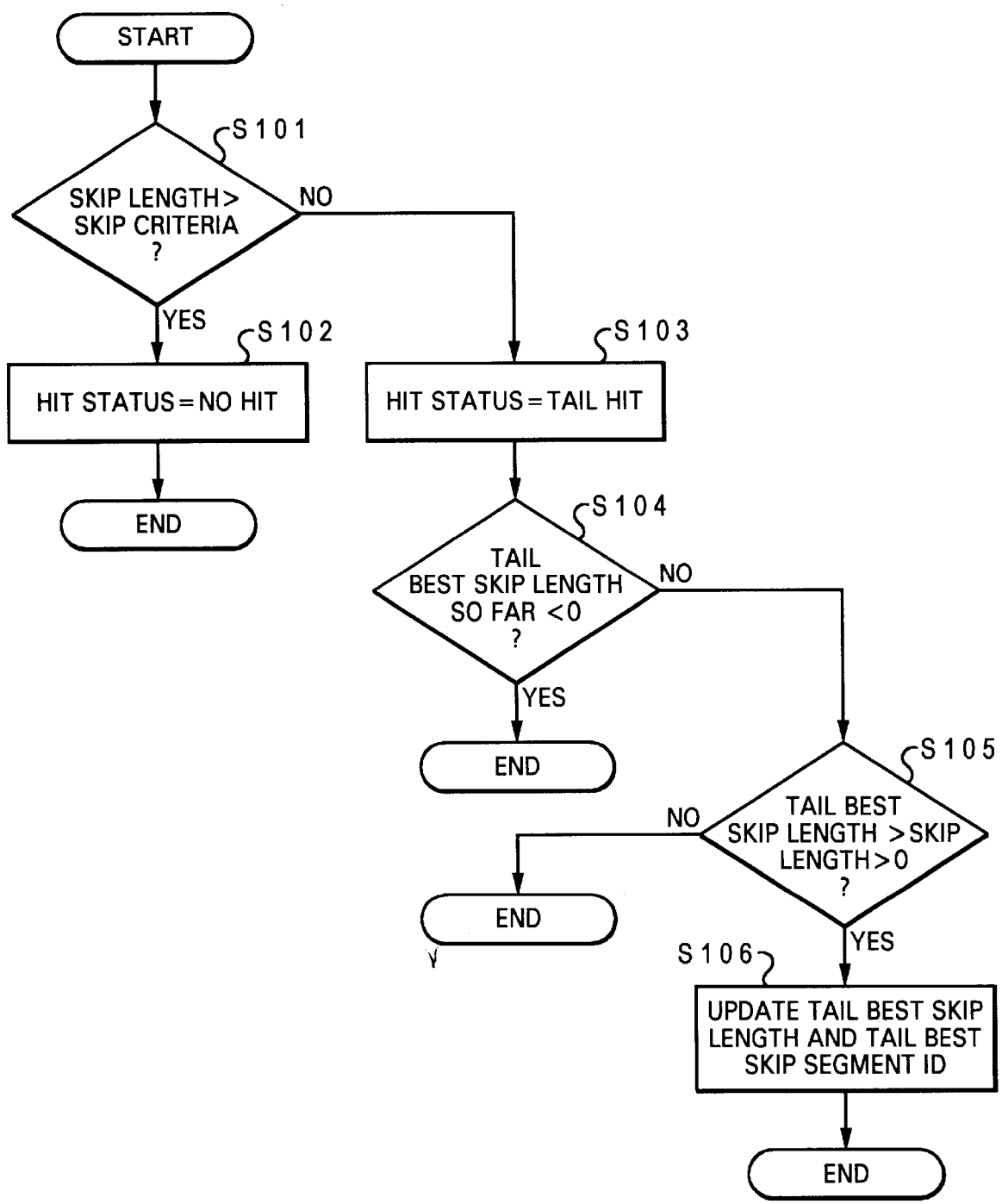
FIG. 7 is a flow chart depicting subsequent processing when the relation between buffer data and write commands is NO HIT-A in accordance with the presentation.

When the case is determined as NO HIT-A, the determination depicted in FIG. 7 is made. In step S101, it is determined whether SKIP LENGTH is greater than SKIP CRITERIA. Here, SKIP LENGTH is a value defined as LLBA–SLBA+1 and indicates the distance between the tail of the buffer data and the head of the write command.

In the case where SKIP LENGTH is greater than SKIP CRITERIA, it is determined in step S102 that the write command is NO HIT with respect to the buffer data. In the case where the distance between the head of the write command and the tail of the buffer data is greater than SKIP CRITERIA (a predetermined distance), this case is determined as NO HIT. If the case is determined as NO HIT, it is assumed that there is no relation between the buffer data and write command and processing such as a sequential write is not performed when a data write is performed.

In the case where SKIP LENGTH is equal to or less than SKIP CRITERIA, it is determined in step S103 that the write command is TAIL HIT relative to the buffer data. It is assumed that though the buffer data is separate from the write command and the distance is equal to or less than a predetermined distance. Therefore, these two are regarded as continuous data and a write will be performed sequentially in execution of a data write. This is effective for performance improvement by RPO. This is the same as if the case is determined as NO HIT-B.

In the case where the case is determined as TAIL HIT, it is determined in step S104 whether TAIL BEST SKIP LENGTH so far is less than 0. In the case where TAIL BEST SKIP LENGTH is less than 0, the processing ends. Otherwise, it is determined in step S105 whether SKIP LENGTH this time is smaller than TAIL BEST SKIP LENGTH. In the case where SKIP LENGTH is smaller than TAIL BEST SKIP LENGTH, SKIP LENGTH is designated as TAIL BEST SKIP LENGTH in step S106, and TAIL BEST SKIP LENGTH and TAIL BEST SKIP SEGMENT ID are updated. Otherwise, the processing ends.

Figure 23:
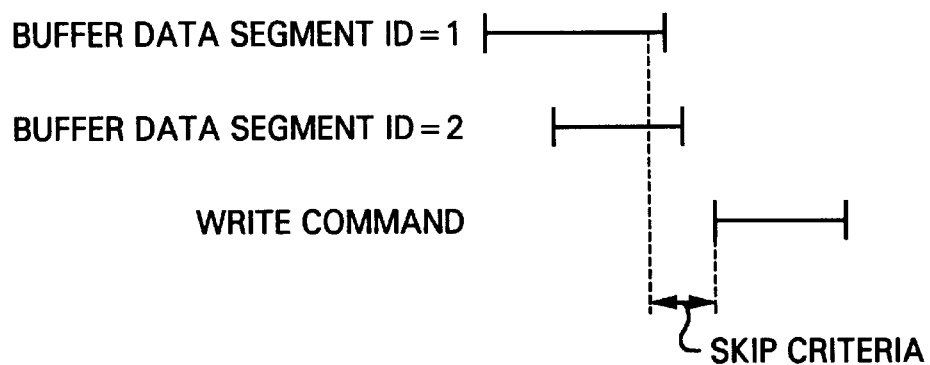
FIG. 23 is an illustration to explain BEST TAIL SKIP LENGTH in accordance with the presentation.

Here, TAIL BEST SKIP LENGTH will be explained with reference to FIG. 23. FIG. 23 shows a write command resulting in TAIL HIT for two buffer data items. However, it is observed that SKIP LENGTH of the buffer data with segment ID of 2 is smaller than that of the buffer data with segment ID of 1. In this case, TAIL BEST SKIP LENGTH of the write command becomes SKIP LENGTH of the buffer data with segment ID of 2 and TAIL SKIP SEGMENT ID becomes 2. TAIL BEST SKIP LENGTH and TAIL SKIP SEGMENT ID are stored in the table shown in FIG. 16.

TAIL_SEQ

Figure 8:
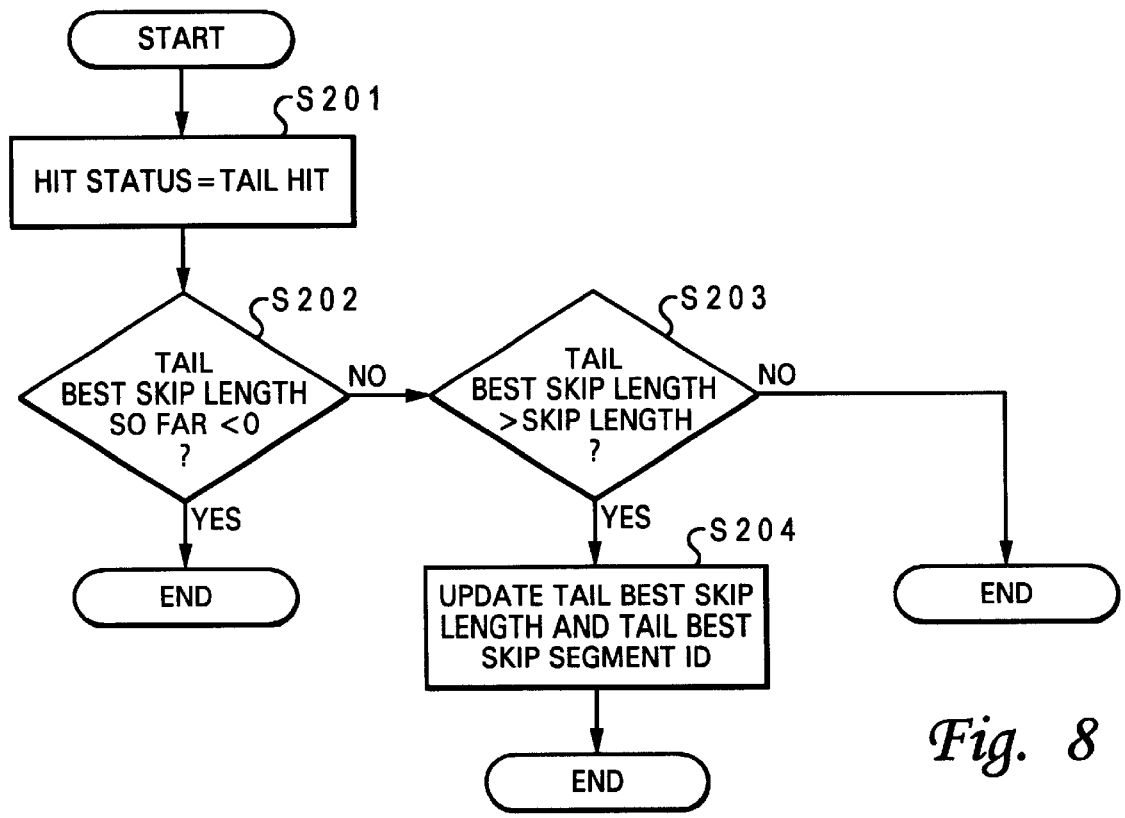
FIG. 8 is a flow chart illustrating subsequent processing when the relation between buffer data and write commands is TAIL_SEQ in accordance with the presentation.

For the case determined as TAIL_SEQ, the processing shown in FIG. 8 is performed.

In the case of TAIL_SEQ, the hit status is determined as a TAIL HIT in step S201. Then, it is determined in step S202 whether TAIL BEST SKIP LENGTH so far is less than 0 or not. In the case where TAIL BEST SKIP LENGTH is less than 0, the processing ends. Otherwise, it is determined in step S203 whether SKIP LENGTH is smaller than TAIL BEST SKIP LENGTH or not. In the case where SKIP LENGTH is smaller than TAIL BEST SKIP LENGTH, TAIL BEST SKIP LENGTH and TAIL BEST SKIP SEGMENT ID are updated in step S204.

OV_TAIL

Figure 9:
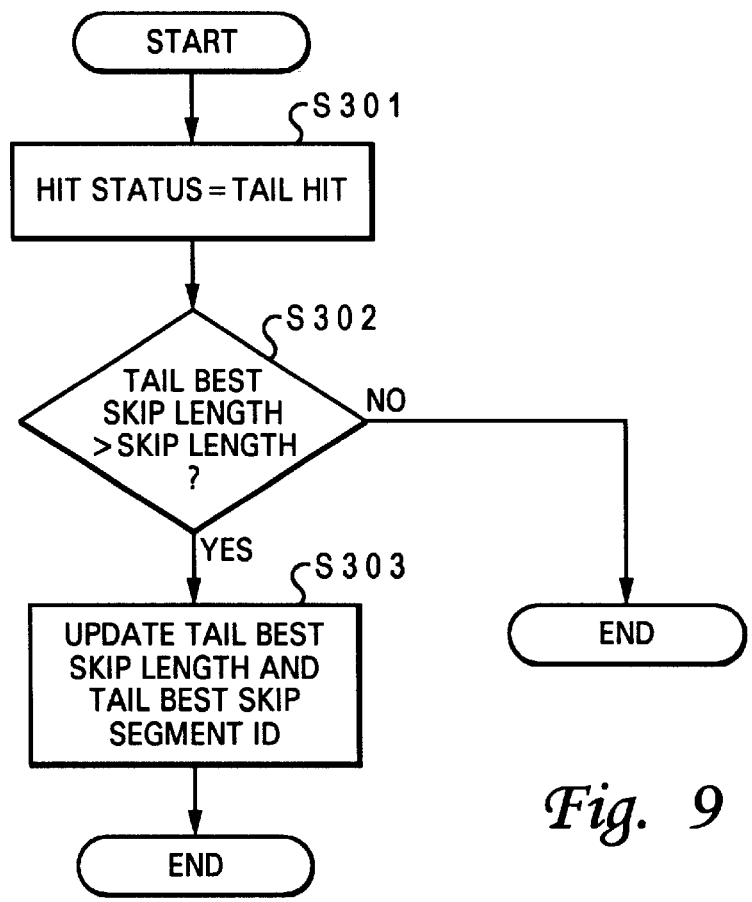
FIG. 9 is a flow chart depicting subsequent processing when the relation between buffer data and write commands is OV_TAIL in accordance with the presentation.

For the case determined as OV_TAIL, the processing shown in FIG. 9 is performed.

First, in step S301, the hit status is determined as a TAIL HIT. Then, in step S302 it is determined whether SKIP LENGTH is smaller than TAIL BEST SKIP LENGTH. In the case where SKIP LENGTH is smaller than TAIL BEST SKIP LENGTH, TAIL BEST SKIP LENGTH and TAIL BEST SKIP SEGMENT ID are updated in step S303. Otherwise, the processing ends.

OV_ALL

Figure 10:
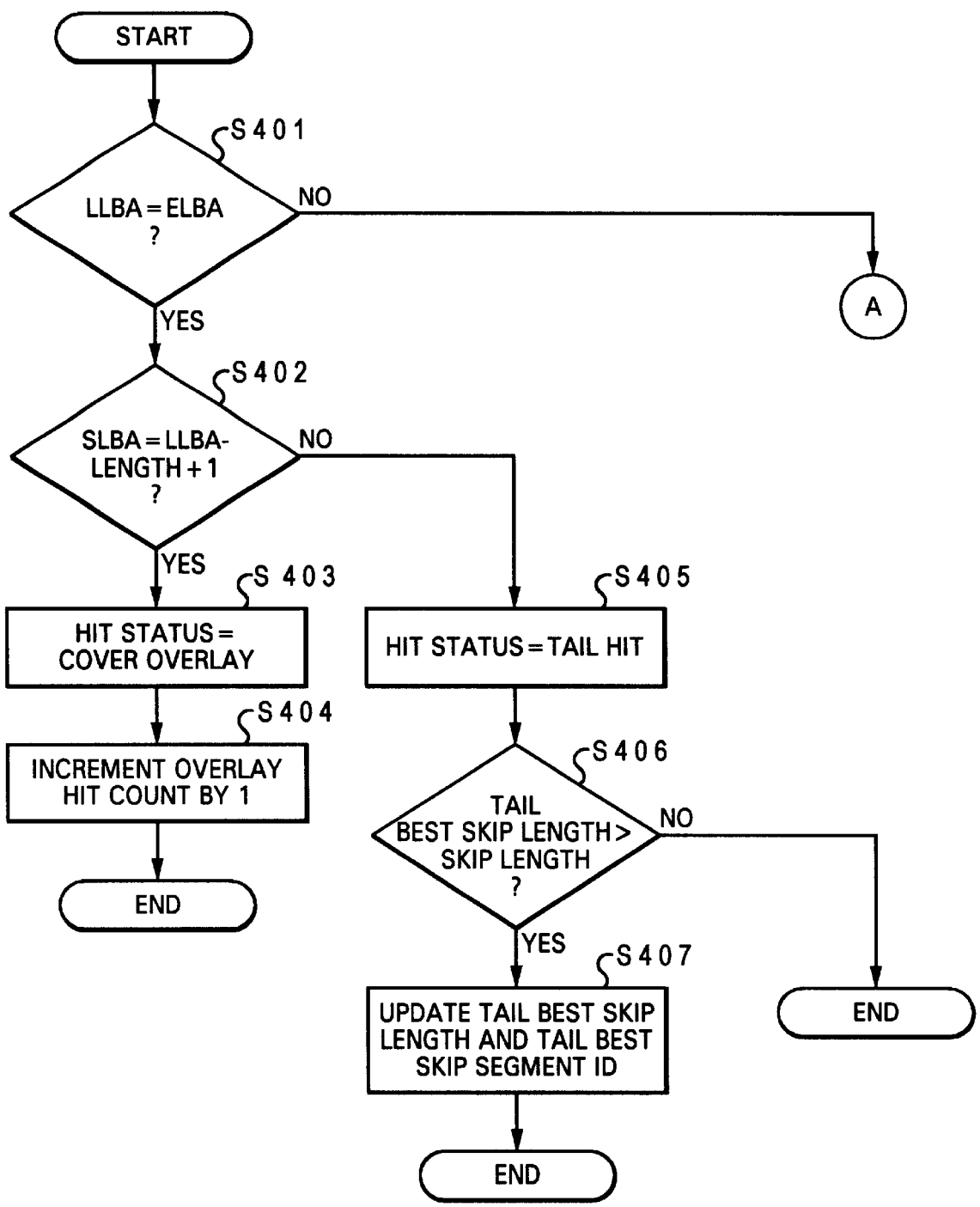
FIG. 10 is a flow chart illustrating subsequent processing when the relation between buffer data and write commands is OV_ALL in accordance with the presentation.
Figure 11:
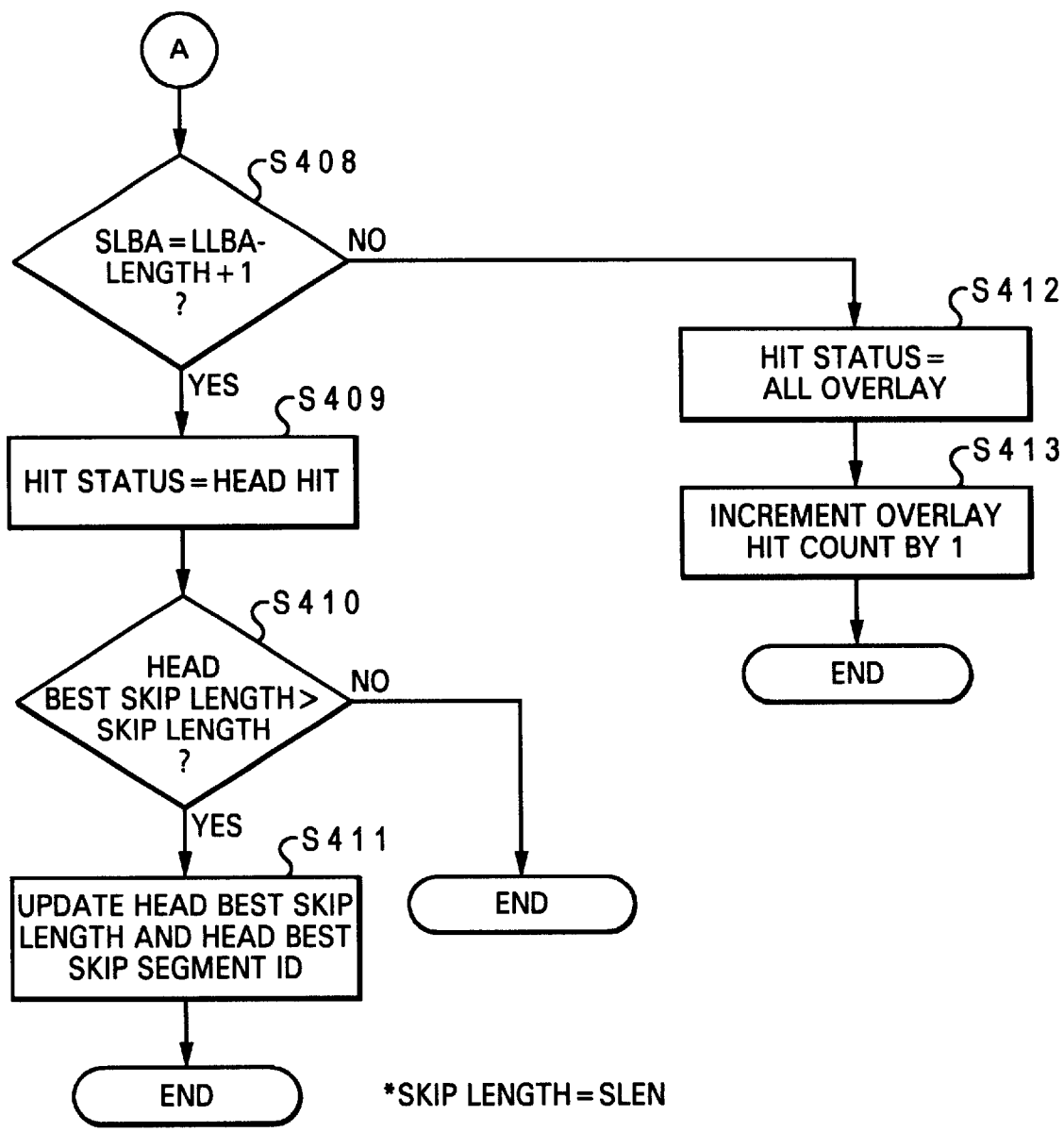
FIG. 11 is a flow chart depicting subsequent processing when the relation between buffer data and write commands is OV_ALL in accordance with the presentation.

For the case determined as OV_AIL, the processing shown in FIG. 10 and FIG. 11 is performed.

First, in step S401, it is determined whether LLBA is equal to ELBA. If so, the process moves on to step S402. In the case where LLBA does not equal ELBA, the process moves on to step S408 in FIG. 11.

In step S402, it is determined whether SLBA=LLBA–LENGTH+1. If so, the process moves on to step S403. Otherwise the process moves on to step S405.

In step S404, in the case where it is determined that SLBA matches the LBA at the head of the buffer data, the hit status is determined as COVER OVERLAY. Then, in step S404, the count of OVERLAY HIT is incremented by 1.

In step S405, the hit status is determined as TAIL HIT. Then, in step S406, it is determined whether SKIP LENGTH is smaller than TAIL BEST SKIP LENGTH. If so, TAIL BEST SKIP LENGTH and TAIL BEST SKIP SEGMENT ID are updated in step S407. Otherwise, the processing ends.

In step S408, it is determined whether SLBA=LLBA–LENGTH+1. If so, the process moves on to step S409. Otherwise the process moves on to step S412.

In step S409, the hit status is determined as HEAD HIT. Then, in step S410, it is determined whether SKIP LENGTH (here SLEN) is smaller than HEAD BEST SKIP LENGTH or not. If so, the process moves on to step S411. Otherwise, the process ends.

In step S411, HEAD BEST SKIP LENGTH and HEAD SKIP SEGMENT ID are updated and then, the processing ends.

In S412, the hit status is determined as ALL OVERLAY. In step S413, the count of OVERLAY HIT is incremented by 1 and the processing ends. Here, the count of OVERLAY HIT is incremented in the cell of NO OF HIT in the table shown in FIG. 16.

OV_COVER

Figure 12:
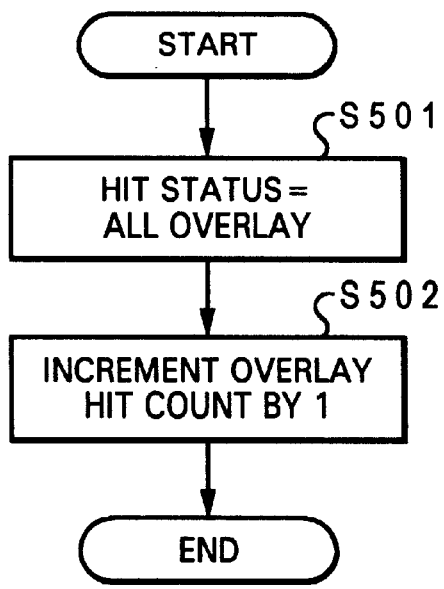
FIG. 12 is a flow chart depicting subsequent processing when the relation between buffer data and write commands is OV_COVER in accordance with the presentation.

For the case determined as OV_COVER, the hit status is determined as ALL OVERLAY in step S501 as shown in FIG. 12. Then, in step S502, the count of OVERLAY HIT is incremented by 1 and the processing ends.

OV_HEAD

Figure 13:
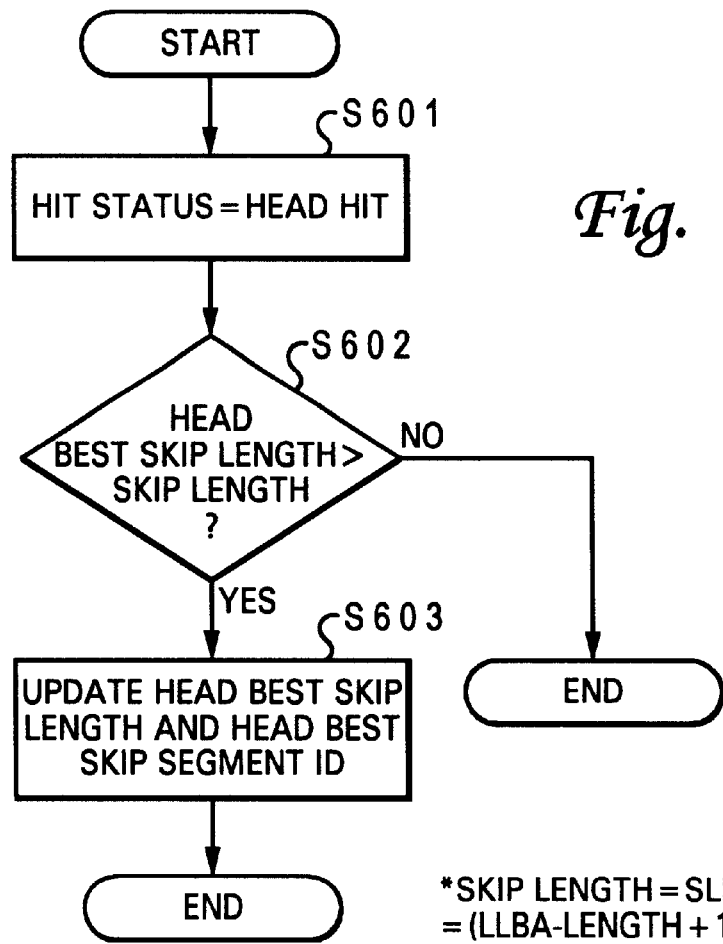
FIG. 13 is a flow chart depicting subsequent processing when the relation between buffer data and write commands is OV_HEAD in accordance with the presentation.

For the case determined as OV_HEAD, the processing shown in FIG. 13 is performed.

In the case of OV_HEAD, the hit status is determined as HEAD HIT in step S601. Then, in step S602, it is determined in step S602 whether SKIP LENGTH (determined here as (LLBA–LENGTH+1)–ELBA) is smaller than HEAD BEST SKIP LENGTH. If so, HEAD BEST SKIP LENGTH and HEAD BEST SKIP SEGMENT ID are updated in step S603. Otherwise, the processing ends.

HEAD_SEQ

Figure 14:
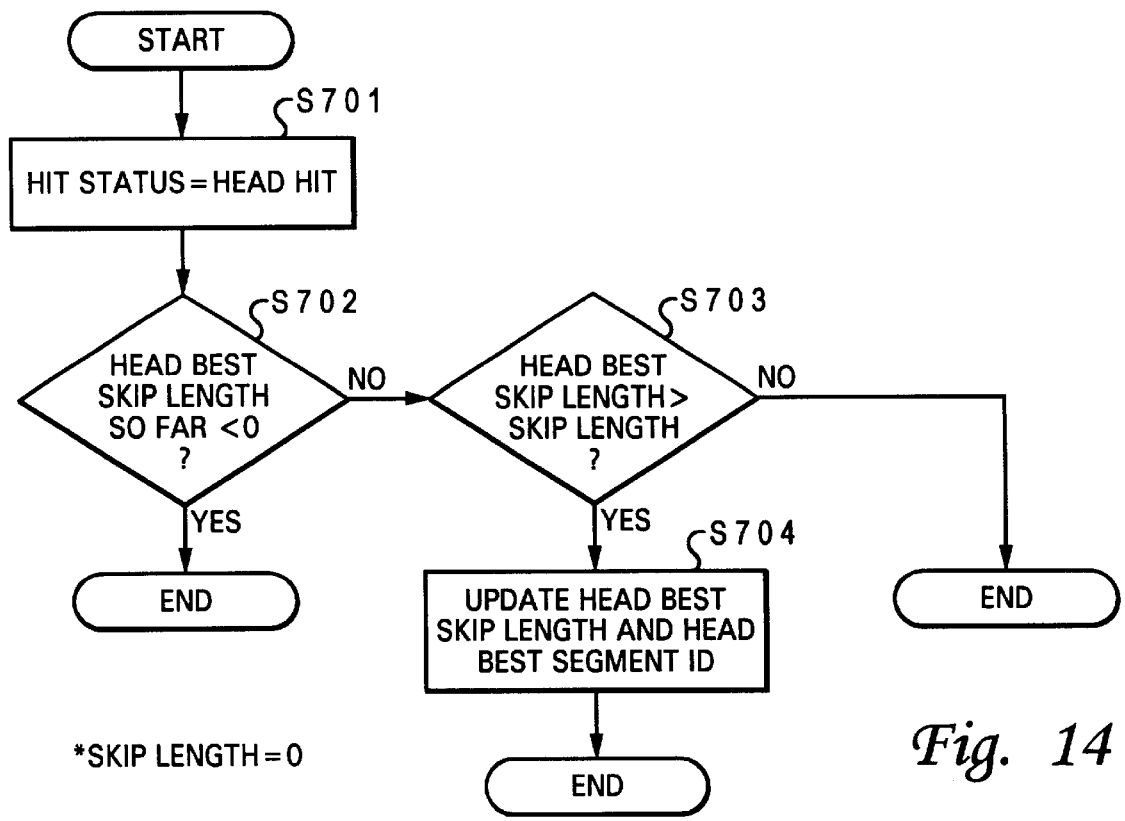
FIG. 14 is a flow chart illustrating subsequent processing when the relation between buffer data and write commands is HEAD_SEQ in accordance with the presentation.

For the case determined as HEAD_SEQ, the processing shown in FIG. 14 is performed.

In the case of HEAD_SEQ, the hit status is determined as HEAD HIT in step S701. Then, in step S702, it is determined whether BEST HIT SKIP LENGTH so far is negative. If so, the processing ends. Otherwise, the process moves on to step S703.

In step 703, it is determined whether SKIP LENGTH is smaller than HEAD BEST SKIP LENGTH. This SKIP LENGTH is zero. If so, HEAD BEST SKIP LENGTH and HEAD BEST SKIP SEGMENT ID are updated in step S704 and the processing ends.

NO HIT-B

Figure 15:
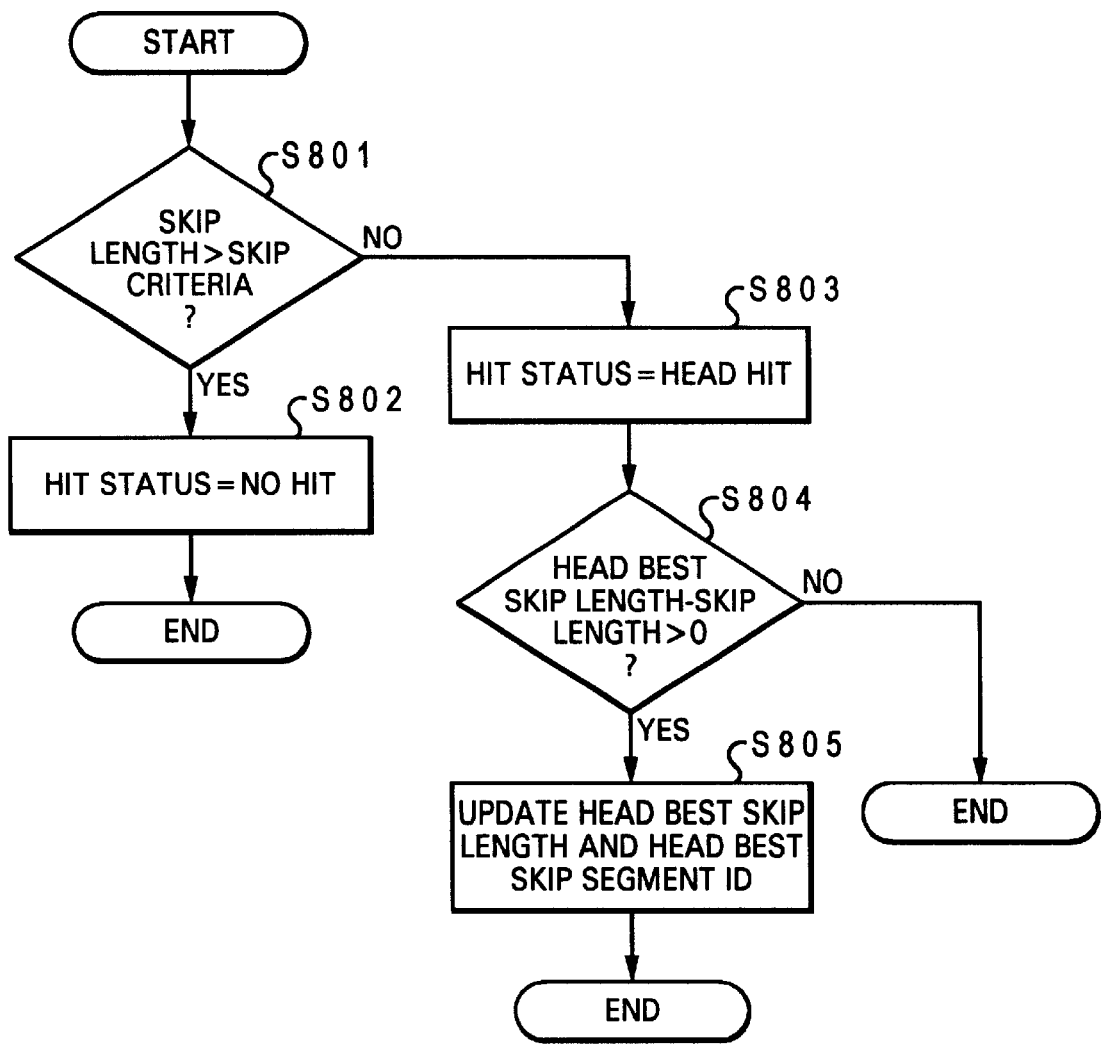
FIG. 15 is a flow chart depicting subsequent processing when the relation between buffer data and write commands is NO HIT-B in accordance with the presentation.

For the case determined as NO HIT-B, the processing shown in FIG. 15 is performed. That is, in step S801, it is determined whether (LLBA–LENGTH+1)–ELBA is greater than SKIP CRITERIA.

In the case where SKIP LENGTH is greater than SKIP CRITERIA, the hit status is determined as NO HIT in step S802.

In the case where SKIP LENGTH is equal to or less than SKIP CRITERIA, the hit status is determined as HEAD HIT in step S803. Then, the process moves on to step S804.

In step S804, it is determined whether SKIP LENGTH is less than HEAD BEST SKIP LENGTH. Here, SKIP LENGTH is defined as (LLBA−LENGTH+1)−ELBA. In the case where HEAD BEST SKIP LENGTH is less than or equal to SKIP LENGTH, the processing ends. In the case where SKIP LENGTH is less than HEAD BEST SKIP LENGTH, HEAD BEST SKIP LENGTH and HEAD BEST SKIP SEGMENT ID are updated in step S805 and the processing ends.

Figure 24:
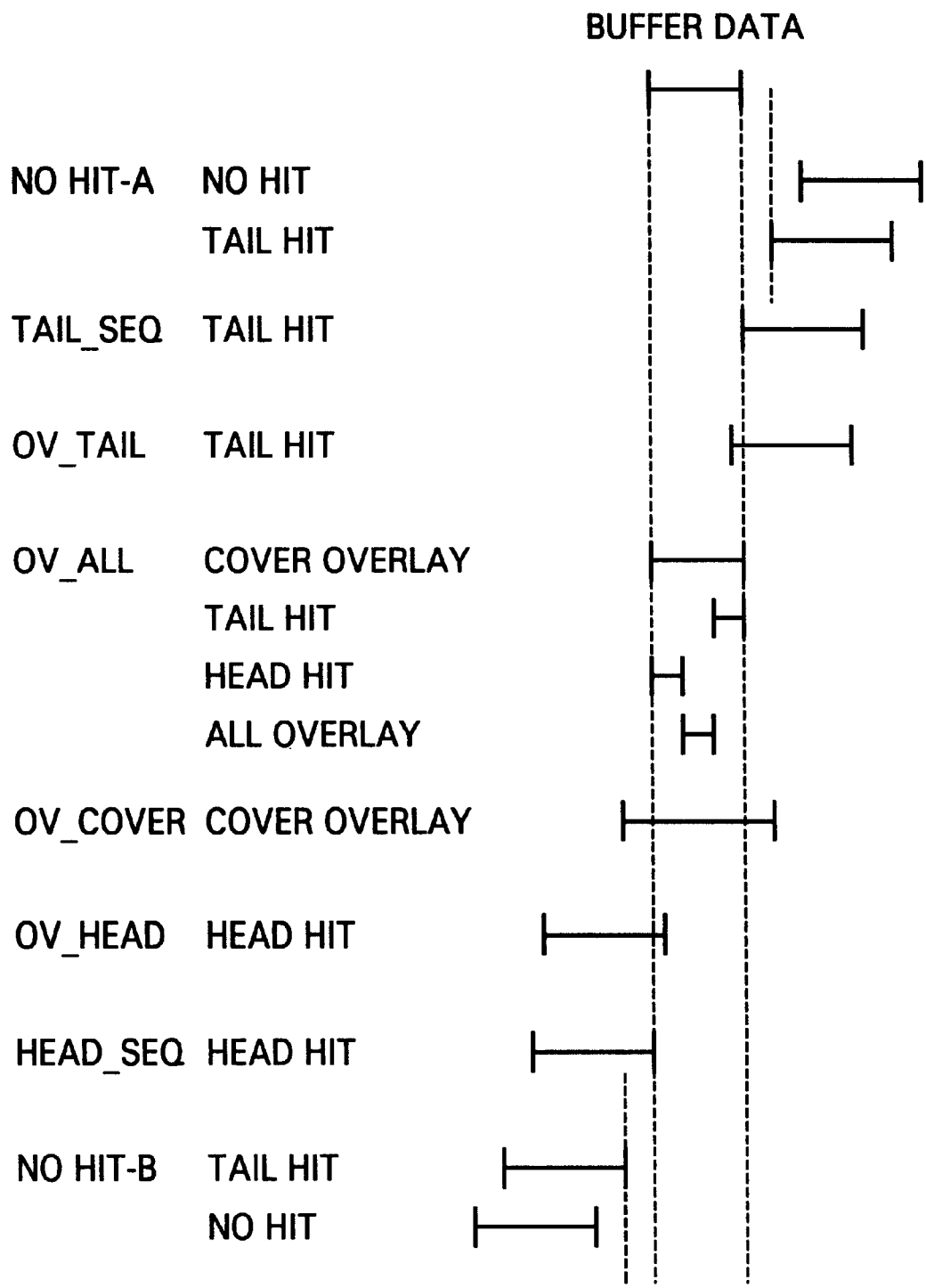
FIG. 24 depicts the positional relation between buffer data and hit statuses determined in FIGS. 7 through 15.

As is explained above, this embodiment adopts the technique of roughly classifying the relation between buffer data and a write command in the beginning as illustrated in FIG. 3 and then more specifically, determining the relation between the buffer data and command as depicted in FIGS. 7 through 15. FIG. 24 illustrates the relations between NO HIT-A, TAQIL_SEQ, OV_TAIL, OV_ALL, OV_COVER, OV_HEAD, HEAD_SEQ, NO HIT_B and each hit status determined in FIGS. 7 through 15 including the positional relation with the buffer data.

The aforementioned determinations are made every time host 40 issues a write request by the segment handler (SG) accessing RAM 43 in which the segment table is stored via the memory manager (MM). The write segment that makes up the segment table is configured by 4 words as illustrated in FIG. 16. Of the 4 words, LBA uses the 1st and 2nd words, BLOCK LENGTH (LENGTH) uses the 3rd word and HIT STATUS uses the 4th word.

A conventional HDD has only one set of these write segments and does not use the 4th word. On the other hand, this embodiment provides 64 sets of the write segments depicted in FIG. 16 and, moreover, uses the 4th word, which has been unused conventionally, for the hit status. The write command is stored in RAM 43.

The hit status stored in this write segment is reflected in RPO (Rotational Position Optimization). When a command waiting to be executed is performed, RPO estimates the time after a seek to a target track on the magnetic disk 21 is started until the relevant track is reached. Added to that is the disk rotation waiting time after the relevant track is reached until access to the target sector is started. RPO is the technique of selecting a command waiting to be executed corresponding to the smallest sum of this seek time and rotation waiting time as the next command to be executed.

As described above, this embodiment can link write commands that can be regarded as a series of data from among a plurality of write commands by referencing the hit status stored in the write segment. That is, in the case where commands are not mutually NO-HIT, the commands can be deemed as the targets to be written sequentially as a cluster of a series of commands.

As described above, this embodiment provides 64 sets of write segment, and therefore, there can be a plurality of the above-described command clusters. In the case where such a plurality of command clusters exists, writing is executed starting with a command cluster corresponding to the smallest sum of a seek time and rotation waiting time according to the conventional RPO. Of course, there can also be write commands that do not form a command cluster, and therefore the write command execution sequence is determined between such write commands or command groups according to the conventional RPO.

The above processing concept will be explained with reference to FIG. 18.

FIG. 18a shows a plurality of commands 1 to 6 requested to write by host 40. Numbers 1 to 6 assigned to the commands denote the sequence of write requests sent from the host and the horizontal axis denotes LBA.

In FIG. 18a, based on the aforementioned comparison of LBA, it is determined that commands 1 and 3, and commands 2 and 5 form a series of data groups. However, commands 4 and 6 have nothing to do with other commands and can be determined as NO HIT. Therefore, commands 1 to 6 can be replaced with 6 data groups A to D shown in FIG. 18b. Then, the sequence of writing is arranged not in the sequence of the commands sent from host 40 but in a sequence of A, B, C and D.

Then, the processing, when writing of data groups determined as OVERLAY HIT is performed, will be explained based on FIG. 19.

Figure 19:
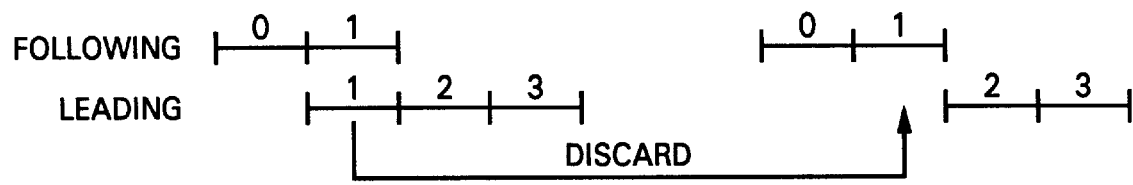
FIG. 19 depicts a data write in the case of OVERLAY HIT according to a preferred embodiment in accordance with the presentation.

As shown in FIG. 19, suppose the LBA of a leading write request command (buffer data) is 1, 2 and 3 and the LBA of a following write request command (write command) is 0 and 1. The hit status of the write command corresponding to the buffer data is OVERLAY HIT and the block LBA1 overlaps. In the case where a buffer data write is executed after simply executing a write command according to RPO, the data of the write command is overwritten with the data of the buffer data for the LBA1 block. Since the data of the buffer data is older than the data of the write command, the above-described overwrite causes the old data to overwrite the new data.

Thus, this embodiment discards the overlapping block of the buffer data as shown on the right side of FIG. 19. Then, this embodiment executes a write of the buffer data and then executes writing of a write command. This allows new data to be also written in the overlapping section.

When a read request is issued while write commands are waiting to be executed, the conventional HDD apparatus performs the read request command after all waiting write commands are executed. However, executing the read request command after all write commands are performed would cause a data read to be delayed. The read command should be given priority at this moment. Thus, when host 40 issues a read request command while a plurality of write commands is waiting to be executed, this embodiment allows a read command to be executed as an interrupt before all write commands are finished.

When a read request is issued while a plurality of write commands are waiting to be executed and the write commands are interrupted by the read request command, this is a case where there is an overlap between the read request command and write request commands waiting to be executed. This will be explained referring to FIG. 20.

FIG. 20 depicts a relation between one write command and one read command for ease of understanding.

Figure 20A:
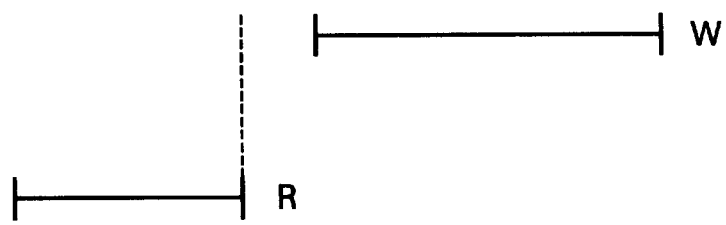
FIGS. 20a, and 20b illustrate the relation between a write command and a read command in accordance with the presentation.
Figure 20B:
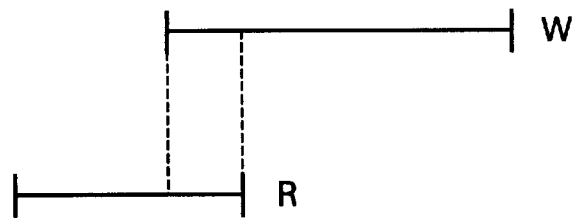

FIG. 20a illustrates a case where there is no overlap on LBA between a leading write command ("W") and a following read command ("R"). In this case, there is no problem in the case where read command R is performed first before the write command W is executed. However, as shown in FIG. 20b, in the case where there is an overlap on LBA between write command W and read command R, executing read command R first before performing the write command W will involve the following problem:

The read request from host 40 should be issued to the latest data. FIG. 20b illustrates the case where data by write command W is the latest data. As described above, there is an overlap on LBAs between write command W and read command R. In this overlapping section, the data to be read by write command R is the data by write command W. Therefore, in the case where read command R is performed before write command W and the data is actually written, the data read by execution of this read command R includes part that is not the latest part. If this is the case, read command R cannot be considered to have been executed correctly.

In the case where a read request is issued when there are a plurality of write commands waiting to be executed, this embodiment checks the positional relation between the LBA of the write commands waiting to be executed and the LBA of the read command requested from host 40. Then, in the case where there is a write command waiting to be executed which have the positional relation shown in FIG. 20b, the write command is performed first, then the read command is allowed to interrupt and executed ahead of other write commands waiting to be executed.

Figure 21A:
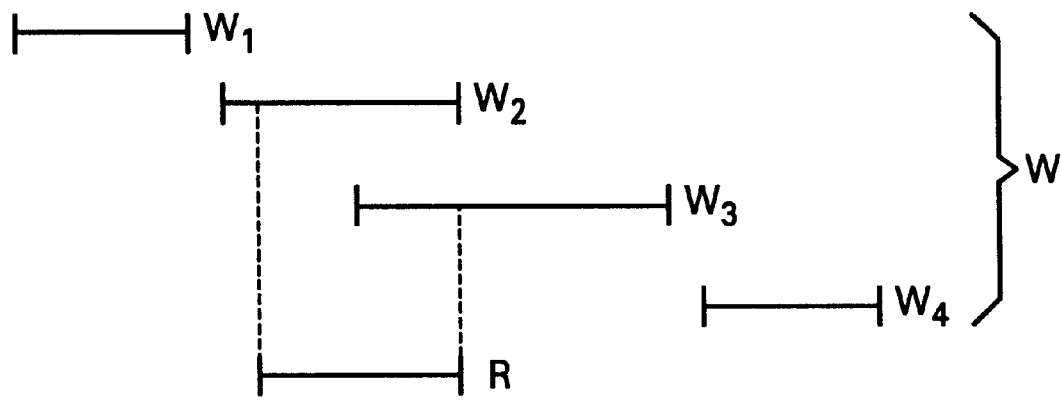
FIGS. 21a, and 21b are illustration depicting a state in which a read command is issued when a plurality of write commands is waiting to be executed in accordance with the presentation.

With reference to FIG. 21a, suppose W1 to W4 are write commands waiting to be executed and R is a read command requested from the host 40 while write commands W1 to W4 are waiting to be executed.

Figure 21B:
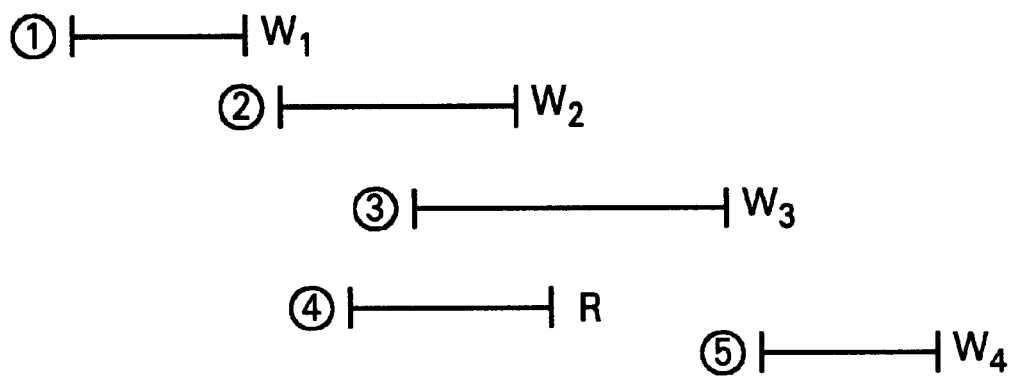

As illustrated in FIG. 21a, there is an overlap on LBAs between read command R and write commands W2, W3. Therefore, in order to execute read command R, write commands W1, W2 and W3 are executed first. Then, read command R is executed as depicted in FIG. 21b. Then, write command W4 is executed after read command R. By doing so, data read by execution of read command R includes the latest data. Sequences 1 to 5, illustrated in FIG. 21b denote the execution sequence.

Figure 22A:
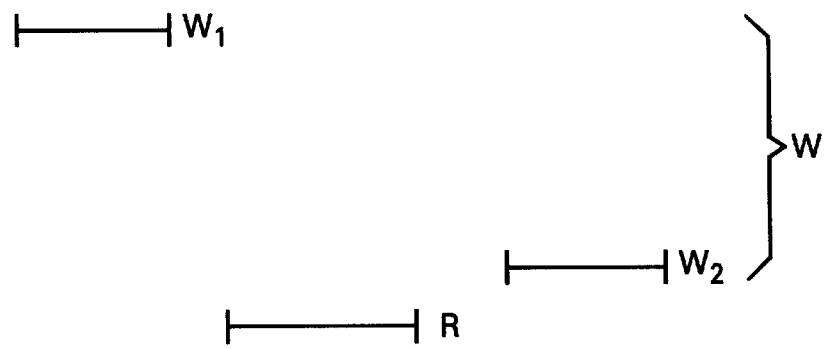
FIGS. 22a, and 22b are illustration explaining a state in which a read command is issued when a plurality of write commands is waiting to be executed in accordance with the presentation.
Figure 22B:
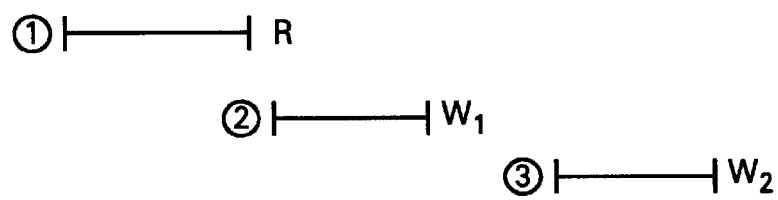

FIG. 21 depicts the case where there is an overlap on LBAs between read command R and write commands W2 and W3. In the case where there is no overlap on LBAs between read command R and write commands as illustrated in FIG. 22a, it is also possible to allow read command R to interrupt write command W1 and execute read command R before write command W1 as depicted in FIG. 22b.

What is claimed is:

1. A data writing method of writing write data received from a host device onto a recording medium, comprising:
   comparing a first logical block address of a leading write command awaiting execution with a second logical block address of a following write command that is newly issued to determine a distance therebetween;
   determining whether said distance is equal to or less than a predetermined distance in the case where said first and second logical block addresses are determined to be separate;
   writing data corresponding to said leading write command and data corresponding to said following write command sequentially on said recording medium in the case where the distance is determined to be equal to or less than said predetermined distance; and
   if there are a plurality of following write commands having each having a respective distance from said leading write command equal to or less than said predetermined distance, writing data corresponding a particular one of said plurality of following write commands having a least distance from said first logical block address immediately after writing data corresponding to said leading write command.

2. A data reading method when a host device issues a data read request while one or more data write commands are waiting to be executed, said method comprising:
   determining whether there is any overlap between a first logical block address of a selected write command among said one or more write commands awaiting execution and a second logical block address of a subsequently issued read command; and
   retaining said selected write command in a command cache and executing said read command before executing said selected write commands in response to determining that there is no overlap between said first and second logical block addresses.

3. The data reading method according to claim 2, wherein said read command is executed following the execution of a selected write command among said one or more write commands having a least distance between a head of said logical block address of said selected write command and a tail of said logical block address of said read command.

4. A disk drive apparatus comprising:
   a command cache for retaining a write command sent from an external device until said write command is executed;
   means for determining whether there is any overlap between a first logical block address of said write command retained in said command cache and a second logical block address of a subsequent write command newly sent from said external device;
   means, responsive to determining that there is no overlap, for determining whether a distance between the first and the second logical block addresses is greater than a predetermined distance; and
   means, responsive to determining that the distance between the first and second logical block addresses is not greater than said predetermined distance, for instructing that write data corresponding to said two commands be written in said recording medium sequentially, said means for instructing including:
      means, if there are a plurality of following write commands having each having a respective distance from said leading write command equal to or less than said predetermined distance, for writing data corresponding a particular one of said plurality of following write commands having a least distance from said first logical block address immediately after writing data corresponding to said leading write command.

5. The disk drive apparatus of claim 4, and further comprising:
   a randomly accessible disk-shaped recording medium.

6. A disk drive apparatus comprising:
   a command cache for retaining a write command sent from an external device until said command is executed;
   means for determining a relation between a first logical block address of a read command for a read request sent from said external device and a second logical block address of said write command retained in said command cache; and
   means for instructing a read access to said disk-shaped recording medium in response to determining the relation between said first and second logical block addresses said means for instructing including:
      means, responsive to determining that said first and second logical block addresses do not overlap, for instructing that said read command be executed while said write command waiting to be executed is retained in said command cache.

7. The disk drive apparatus of claim 6, and further comprising:
   a randomly accessible disk-shaped recording medium.

8. The disk drive apparatus according to claim 7, said means for determining a relation comprising means for determining whether or not said first and second logical block addresses overlaps.

9. The disk drive apparatus according to claim 7, and further comprising means, responsive to determining that said first and second logical block addresses overlap, for instructing said command cache to execute said read command after executing said write commands.

10. A disk drive apparatus that controls data writing to a randomly accessible disk-shaped recording medium, comprising:

a command cache for retaining a leading write command sent in advance from an external device until said leading write command is executed;

means for determining whether a distance between a first logical block address of said leading write command buffered in said command cache and a second logical block address of a following write command subsequently received from said external device is equal to or less than a predetermined distance; and means, responsive to determining that there said distance is equal to or less than said predetermined distance, for instructing that said following write command is to be executed before said leading write command.

11. The disk drive apparatus of claim 10, and further comprising:

a randomly accessible disk-shaped recording medium.

12. A data writing method of writing write data received from a host device onto a disk recording medium, said method comprising:

buffering a leading write command sent in advance from an external device until said leading write command is executed;

determining whether a distance between a first logical block address of said leading write command and a second logical block address of a following write command subsequently received from said external device is equal to or less than a predetermined distance; and in response to determining that said distance is equal to or less than said predetermined distance, causing said following write command to be executed before said leading write command.

* * * * *

UNITED STATES PATENT AND TRADEMARK OFFICE
CERTIFICATE OF CORRECTION

PATENT NO. : 6,654,852 B2
DATED : November 25, 2003
INVENTOR(S) : Kanamaru et al.

It is certified that error appears in the above-identified patent and that said Letters Patent is hereby corrected as shown below:

Column 5,
Line 54, instead of "NO HIT-A," should read -- <NO HIT-A> --
Line 59, instead of "TAIL_SEQ" should read -- <TAIL_SEQ> --
Line 63, instead of "OV_TAIL" should read -- <OV_TAIL> --
Line 67, instead of "OV_ALL" should read -- <OV_ALL> --

Column 6,
Line 4, instead of "OV_COVER" should read -- <OV_COVER> --
Line 8, instead of "OV_HEAD" should read -- <OV_HEAD> --
Line 12, instead of "HEAD_SEQ" should read -- <HEAD_SEQ> --
Line 16, instead of "NO HIT-B" should read -- <NO HIT-B> --
Line 64, instead of "NO HIT-A" should read -- <NO HIT-A> --

Column 7,
Line 45, instead of "TAIL_SEQ" should read -- <TAIL_SEQ> --
Line 58, instead of "OV_TAIL" should read -- <OV_TAIL> --

Column 8,
Line 1, instead of "OV_ALL" should read -- <OV_ALL> --
Line 35, instead of "OV_COVER" should read -- <OV_COVER> --
Line 40, instead of "OV_HEAD" should read -- <OV_HEAD> --
Line 50, instead of "HEAD_SEQ" should read -- <HEAD_SEQ> --
Line 63, instead of "NO HIT-B" should read -- <NO HIT-B> --

UNITED STATES PATENT AND TRADEMARK OFFICE
CERTIFICATE OF CORRECTION

PATENT NO.    : 6,654,852 B2
DATED         : November 25, 2003
INVENTOR(S)   : Kanamaru et al.

It is certified that error appears in the above-identified patent and that said Letters Patent is hereby corrected as shown below:

Column 13,
Line 22, instead of "means, responsive to determining that there said distance" should read -- means, responsive to determining that said distance --

Signed and Sealed this

Tenth Day of February, 2004

JON W. DUDAS
*Acting Director of the United States Patent and Trademark Office*